US009405820B2

(12) United States Patent
Shmueli et al.

(10) Patent No.: US 9,405,820 B2
(45) Date of Patent: Aug. 2, 2016

(54) SYSTEM AND METHOD FOR PARALLEL SEARCHING OF A DOCUMENT STREAM

(75) Inventors: Oded Shmueli, Nofit (IL); Lila Shnaiderman, Haifa (IL)

(73) Assignee: Technion R&D Foundation Ltd., Haifa (IL)

( * ) Notice: Subject to any disclaimer, the term of this patent is extended or adjusted under 35 U.S.C. 154(b) by 804 days.

(21) Appl. No.: 13/016,199

(22) Filed: Jan. 28, 2011

(65) Prior Publication Data
US 2012/0166440 A1   Jun. 28, 2012

Related U.S. Application Data

(60) Provisional application No. 61/300,493, filed on Feb. 2, 2010.

(51) Int. Cl.
*G06F 17/30*   (2006.01)

(52) U.S. Cl.
CPC ................. *G06F 17/30625* (2013.01)

(58) Field of Classification Search
CPC ................................................. G06F 17/30625
USPC ........................................ 707/763, 764, 737
See application file for complete search history.

(56) References Cited

U.S. PATENT DOCUMENTS

| 7,454,415 B1 * | 11/2008 | Bruno et al. | |
| 2004/0103105 A1 * | 5/2004 | Lindblad | G06F 17/30011 |
| 2008/0065596 A1 * | 3/2008 | Shadmon | G06F 17/30911 |
| 2008/0154860 A1 * | 6/2008 | Chen et al. | 707/3 |
| 2008/0215559 A1 * | 9/2008 | Fontoura | G06F 17/30923 |
| 2009/0006329 A1 * | 1/2009 | Cong | G06F 17/2229 |
| 2011/0125730 A1 * | 5/2011 | Bordawekar et al. | 707/718 |

OTHER PUBLICATIONS

Bruno, N. et al., "Holistic Twig Joins: Optimal XML Pattern Matching," ACM SIGMOD 2002, Proceedings of the 2002 ACM SIGMOD international conference on Management of data, Jun. 4-6, 2002, pp. 310-321.
Bordawekar, R. et al., "Parallelization of XPath Queries using Multi-core Processors: Challenges and Experiences," EDBT 2009, Proceedings of the 12th International Conference on Extending Database Technology: Advances in Database Technology, Mar. 24-26, 2009, pp. 180-191.

* cited by examiner

*Primary Examiner* — Alexey Shmatov
(74) *Attorney, Agent, or Firm* — Pearl Cohen Zedek Latzer Baratz LLP

(57) ABSTRACT

A system and method for searching a document for a query pattern. A plurality of streams may be stored each including a linear sequence of nodes. Each stream may be associated with nodes having a common label in a data tree of the document. A query pattern may be searched for in the streams by executing a plurality of threads. Each of two or more of the threads may be used to search different sub-streams of the plurality of streams. Each of the different sub-streams searched for by each thread in each stream may be uniquely correlated with one or more disjoint sub-trees of a partition of the tree into a plurality of sub-trees. The two or more of the plurality of threads may be executed in parallel. A result of the query pattern search may be generated using at least one of the threads.

27 Claims, 6 Drawing Sheets

SYSTEM AND METHOD FOR PARALLEL SEARCHING OF A DOCUMENT STREAM

CROSS-REFERENCE TO RELATED APPLICATIONS

This application claims the benefit of prior U.S. Provisional Application Ser. No. 61/300,493, filed Feb. 2, 2010, which is incorporated by reference herein in its entirety.

BACKGROUND

A document (for example, an extensible markup language (XML) document) may be represented by a tree with nodes. Each node may store or represent labels or data elements of the document and multiple nodes may be connected by edges defining relationships therebetween. A query may be used to search the document by finding nodes in the tree representation that form a predefined pattern. The query may be referred to as a "twig pattern." The query may search for all occurrences of the twig pattern in the larger document tree. A search result is found when (1) nodes in the twig pattern match nodes in the larger document tree and (2) the relationship between nodes in the twig pattern match the relationship between nodes in the larger document tree.

However, as the size of the document increases, the memory used to store and search a tree representation may grow exponentially.

To simplify the search, reduce memory usage, and increase search speed, the document tree may be simplified into a plurality of linear sequences referred to as "streams." A processing thread may search through each stream, as a whole, for elements matching the query twig pattern.

BRIEF DESCRIPTION OF THE DRAWINGS

The principles and operation of the system, apparatus, and method according to embodiments of the present invention may be better understood with reference to the drawings, and the following description, it being understood that these drawings are given for illustrative purposes only and are not meant to be limiting.

Figure 1:
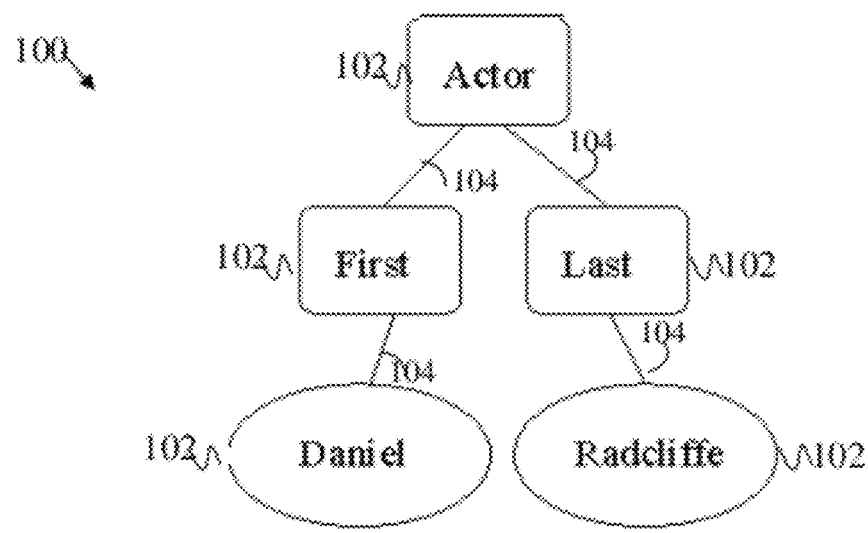
FIG. 1 schematically illustrates a twig pattern for searching a document in accordance with an embodiment of the invention.

For simplicity and clarity of illustration, elements shown in the drawings have not necessarily been drawn to scale. For example, the dimensions of some of the elements may be exaggerated relative to other elements for clarity. Further, where considered appropriate, reference numerals may be repeated among the drawings to indicate corresponding or analogous elements throughout the serial views. Moreover, some elements depicted in the drawings may be combined into a single element or divided into multiple elements.

DETAILED DESCRIPTION

In the following detailed description, various aspects of the present invention have been described. For purposes of explanation, specific configurations and details have been set forth in order to provide a thorough understanding of the present invention. However, it will also be apparent to one skilled in the art that the present invention may be practiced without the specific details presented herein. Furthermore, well known features may have been omitted or simplified in order not to obscure the present invention. Unless specifically stated otherwise, as apparent from the following discussions, it is appreciated that throughout the specification discussions utilizing terms such as "processing," "computing," "calculating," "determining," "searching," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Embodiments of the invention may provide systems and methods for searching a document. The document may be contained in a database, for example, a native database. The document may be, for example, an XML document or any digital document that may be represented by a tree with nodes. The document may include, for example, text elements, data elements, labels, nodes, fields, etc. Different parts of a digital document may have the same or different formats.

The document may include a database or network of ordered, labeled trees having nodes and edges. Each node may correspond to an element or a value, and the edges (tree branches) may represent direct element-sub element or element-value relationships.

The document tree may be stored as a plurality of streams, for example, linear sequences or one dimensional arrays of nodes. When described herein the steams are linear in the sense that they may be thought of or represented (e.g. in the Figures included herein) as being linear; however, their representation in a computer memory need not be "linear". The relationships or ordering of the nodes in the stream may be implicitly defined by an order on the nodes in a tree, e.g., obtained by a preorder traversal of the tree nodes. Each stream may be uniquely associated with nodes having element labels in common. That is, each stream may be associated with multiple nodes, where the multiple nodes are associated with the same common element label(s). In other embodiments, a stream may include strings, which may be data elements (not labels) found at leaf nodes (i.e., nodes with no children) in the data tree. For example, Daniel and Radcliff are two strings in FIG. 1. The element labels may label data elements with element tags, attribute-value associations, and/or string values and the edges may define a relationship between the data elements, such as, a consecutive level "parent-child" edges (illustrated using a single line, "/", e.g., in FIG. 2) or consecutive or non-consecutive level "ancestor-descendant" edges (illustrated using a double line, "//", e.g., in FIG. 2). In the example shown in FIG. 5, "movie," "name," "actor," "first," and "last" are element labels in the document. All nodes associated with each respective element label may be grouped together in a different respective stream. For example, all the nodes having the element label "actor" may be grouped together in the "actor" stream. The division of the document into streams based on element labels may be determined by a programmer or fully or semi-automatically by a processor (e.g., processor 301 of FIG. 3), e.g., based on the number of threads available to process the streams.

A query twig pattern may be used to search the document. The query twig pattern may have a tree structure including edges and nodes with element labels. A processing thread or thread of execution may search the streams associated the element labels of the query twig pattern for a match. A processing thread may be a smallest independent unit of processing scheduled by a processor. A processing thread may be a sequence of instructions which is not necessarily the smallest independent unit of processing scheduled by a processor, for example a subset of instructions of an overall process. Since the query twig pattern has a tree structure, each thread may search streams correlated with a tree structure. Searching streams that are not correlated with a tree structure may not work or yield search results. Since conventional threads may have no information as to which portions of a stream correlate with smaller tree structures within the larger complete tree, e.g., sub-trees, conventional threads may be forced to search through entire streams correlated with the complete tree representation of the document.

Embodiments of the invention may provide a system and method for searching sub-trees for a query twig pattern by each of a plurality of threads, in parallel. Executing the threads in parallel may in some embodiments mean executing all threads at once. In other embodiments executing all the threads in parallel may mean executing as many threads concurrently as is possible given the processor(s) involved; some threads may wait for execution. Since the query twig pattern has a tree structure, searching sub-trees also having a tree structure, may provide positive results. In order to search in parallel, each document stream may be divided or searched in multiple disjoint parts or sub-streams. To identify the disjoint sub-streams to be searched by each respective thread, a partition or division of the tree representation may be generated corresponding to a plurality of disjoint sub-trees. Each thread may search the sub-stream portion of a stream uniquely correlated with a sub-tree designated for that thread.

Reference is made to FIG. 1, which schematically illustrates a twig pattern 100 for searching a document in accordance with an embodiment of the invention. Twig pattern 100 defines a query for searching a document or database to find any matching pattern within a tree representation of the document or database. Multiple matching patterns may be found. Twig pattern 100 includes a plurality of nodes 102 defining data element with element labels and edges 104 defining relationships between nodes 102.

A search result for a query may be the pattern(s) or sub-tree(s) within a tree representation, D, of a document or database determined to match a twig pattern, Q, (e.g., twig pattern 100). A match between the twig pattern Q query and tree representation, D, may be determined, for example, when nodes in twig pattern Q map (uniquely correspond) to nodes in D, such that: (i) query node predicates (tests) are satisfied by the corresponding document nodes, and (ii) the structural relationships between query nodes in Q (e.g., parent-child and ancestor-descendant edges) are satisfied by (match) the corresponding relationships between document nodes in D. The search result to the query twig pattern Q having n nodes may be, for example, a sequence of words or values of the document, for example, represented as an n-ary relation including one or more n-tuples $(d_1, \ldots, d_n)$ of document D nodes, each n-tuple of nodes found in one or more sub-streams (e.g., which may be correlated with nodes in one or more sub-trees of the partition) corresponds to a distinct match of the nodes of the twig pattern, Q, in the document, D. These matching words in the document or nodes in the streams or trees that correspond to the twig pattern Q may be, for example, highlighted, retrieved, marked, flagged, tagged, labeled, provided in a list or otherwise indicated as search results. In the example shown in FIG. 1, the twig pattern 100 is actor[first='Daniel' AND last='Radcliffe'], which matches actor elements in a document D that (i) have a child element named 'first' with content 'Daniel', (ii) have a child element 'last' with content 'Radcliffe'. Only parent-child edge types are used in FIG. 1. In general, given a document database D and a query twig pattern Q with any (i) node predicates and (ii) relationships between nodes, the answer to or result of the query in the document or database may be a listing or display of all matches of query pattern Q in document tree D. Each solution or result may include a single document node corresponding to a designated node in the query twig pattern, which may be referred to, e.g., as the target query node.

When the document or database tree structure is represented by a plurality of streams, each stream may store position information of nodes having the same label associated with the stream, for example, defining the position of a string or element occurrence in the database or document tree structure. In one example, position information may be a 3-tuple (DocId, LeftPos:RightPos, LevelNum), where (i) DocId may be the identifier of the document; (ii) LeftPos and RightPos may be the numbers of word from the beginning of the document DocId until the start and the end of the element, respectively; and (iii) LevelNum may be the nesting depth of the element (or string value) in the tree. Other position information methods and fields may be used.

Figure 2:
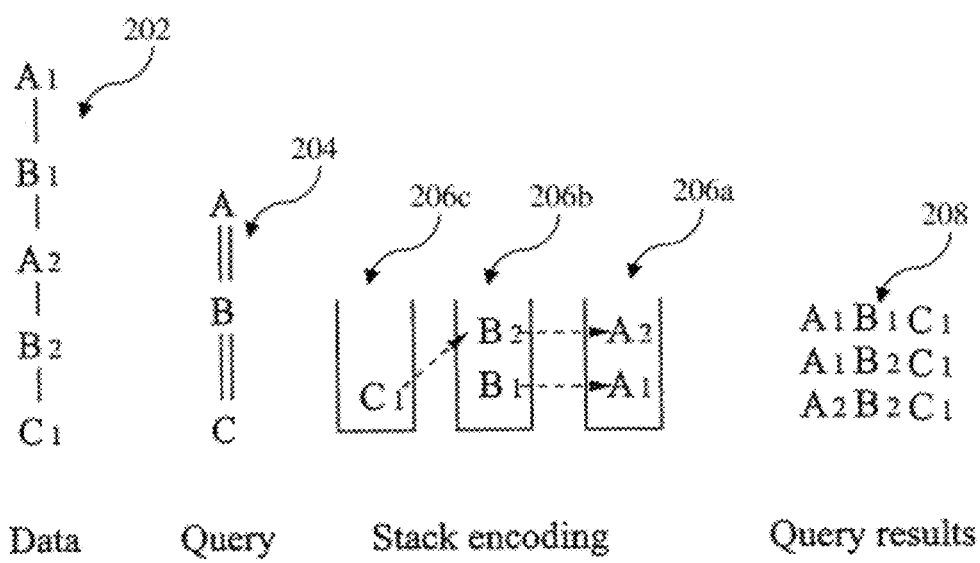
FIG. 2 schematically illustrates a mechanism for extracting a solution of a search of a document in accordance with an embodiment of the invention.

Reference is made to FIG. 2, which schematically illustrates a mechanism for extracting a solution of a search of a document in accordance with an embodiment of the invention. The document may be represented by a tree 202 having data nodes and edges. A query twig pattern 204 may be used to search for all matching edge and node patterns in the document tree 202. The search may be performed over streams. The matches (search results) may be stored for example as stacks 206. The matches may include the entire tree portion matching query twig pattern 204 or a sub-portion thereof, for example, a single node, corresponding to a pre-designated target query node, of the matching tree portion. Stacks 206 may define a compact encoding of partial and total answers to the query twig pattern 204. As the number of matches increases exponentially, stacks 206 information increases only linearly. In one example, different stack 206a, 206b, or 206c may be associated with each different query node (A, B, C, respectively) in query twig pattern 204. Stacks 206a, 206b, or 206c may store position information representing document tree 202 nodes from some streams that match each respective stack's query node (A, B, C). The nodes may be sorted in each stack 206 by one or more position values (e.g., LeftPos value).

The position information for each document tree 202 node (except the highest level node(s)) in each stack (except the first stack 206a) may define the relative position of the node with respect to another document node in another stack. In one example, the position information for each document tree 202 node may include the positional representation of the node in the stack 206 (e.g., sorted by LeftPos values) and a pointer to a "parent node," $S_{parent(q)}$, (e.g., a node at a higher branch level in tree 202) in another stack (e.g., a "parent" or preceding stack 206). In the example shown in FIG. 2, the position information for a document tree 202 node ($C_1$) in a stack (206c) may point to position information for relatively higher level (parent) document node(s) ($B_1$, $B_2$) in a relatively higher level (parent) stack (206b), which in turn points to position information for parent document tree 202 node(s) ($A_1$, $A_2$) in parent stack (206a). This recursive dependence proceeds until the nodes are linked to the highest level (earliest ancestor) node(s) ($A_1$, $A_2$) in parent stack (206a). The set of stacks defines a sequence or chain for each query defining the positional information of matching nodes relative to earlier nodes in tree 202. This set of stacks 206 compactly encodes the set of answers (matches) to the query twig pattern 204. As the number of query nodes increases linearly, the number of document tree 202 node solutions to the query increases, for example, exponentially. Accordingly, stacks 206 may provide a compact encoding to enable fast searching for answers to the query twig pattern 204.

Instead of searching tree 202 itself, embodiments of the invention may search a plurality of streams, the plurality of streams representing tree 202. Each stream may include a unique set of one or more nodes and may be uniquely associated with nodes having the same labels as the stream's label. Each stream may include positional information for document tree 202 nodes whose element label matches the particular element label of the stream.

To increase efficiency, embodiments of the invention may search the streams of the document in parallel, for example by using multiple threads or processes. Each thread or process may search a sub-stream of nodes in streams correlated with a sub-tree of tree 202. Each thread may be designated to search nodes correlated with a specific sub-tree. A partition or division of the tree may be generated defining a plurality of disjoint sub-trees for the search. Each thread or process may identify the sub-stream correlated with the sub-tree designated thereto. Together, the plurality of threads may search multiple disjoint sub-streams of each document stream to process the query search in parallel. When there are more sub-trees than threads, one or more threads may be designated a new sub-tree to search in each iteration of the parallel search. While in one embodiment the partition is created to enable all threads to be executed concurrently, in other embodiments each and every thread or process need not be executed in parallel at the same time. For example, in the case where there are more threads or processes than parallel processing units or processing cores (e.g., cores 303 of FIG. 3), threads may not all be executed at once. For example, threads may be processed by multiple groups, each group including the number of processing units available for simultaneously processing that number of threads, and different groups being processed at different times.

The partition of document tree 202 into a plurality of sub-trees may be defined by information appended or encoded in the document streams. In one embodiment, each stream may store partition information for each document node. Embodiments of the invention may include one or more partition information fields for each node to define a partition of tree 202 into sub-trees. The partition information fields for each node defining the sub-tree partition of the node in the document tree 202 may be stored separately, or together with, the position information fields defining the position of the node in the document tree 202. The partition information field(s) for each node n may be extended XML stream storage fields (EXSS), for example:

numOfSubtreeNodes—the number of nodes of the sub-tree that is rooted at n.

indexInStream—the index (or the positional number) of n in the stream of its label.

structuralData—a pointer to a variable that holds additional structural information about n. This variable holds a link to the parent node of n.

subStreamsH—let t be the sub-tree that is rooted at n. This field may indicate if a sub-stream includes at least one node that belongs to the sub-tree t. subStreamsH may define, for each stream, the name of the stream, the index in the stream of a node that belongs to the sub-tree t which has the smallest left position (LeftPos) value, and the size of the sub-stream, i.e., the number of nodes in the relevant stream that belong to the sub-tree t that is rooted at n.

Partition information may be used to partition a tree and may explicitly or implicitly define which sub-tree a particular node is in. Partition information may be stored for each node in each stream or for a sub-set of nodes in each stream (e.g., only the root nodes of the sub-trees in the partition). Other or different information may be stored.

Each of these field types may be used, alone or in combination, to provide information related to a sub-tree partition or division of tree 202. Once the partition is known, each thread may identify sub-streams within the streams correlated with each sub-tree within the tree 202 for the threads to independently searching each disjoint part of the document in parallel. Partition information fields may be added to each stream containing the node, for example, together with the nodes other document position information. In one example, each stream may store position information (e.g., DocId, LeftPos:RightPos, LevelNum, numOfSubtreeNodes) for each node.

Although additional computations and memory may be used to generate and store the additional partition information fields (e.g., numOfSubtreeNodes), such disadvantage may be significantly outweighed by the computation advantage of reducing computation time by parallel processing enabled by the partition information fields. For example, a stream divided or processed as p separate sub-streams may be searched approximately p times faster than an undivided stream. Since the complex network of document streams and trees may be vast, expediting the searching process may be valuable for real time and efficient processing.

It may be appreciated that some searching mechanisms may use different partition information fields or need not use partition information fields, but may instead use a binary search mechanism to auto-correlate matching sub-streams and sub-trees and identify the boundaries of different sub-streams to be separately searched, e.g., in parallel, by different threads.

Figure 3:
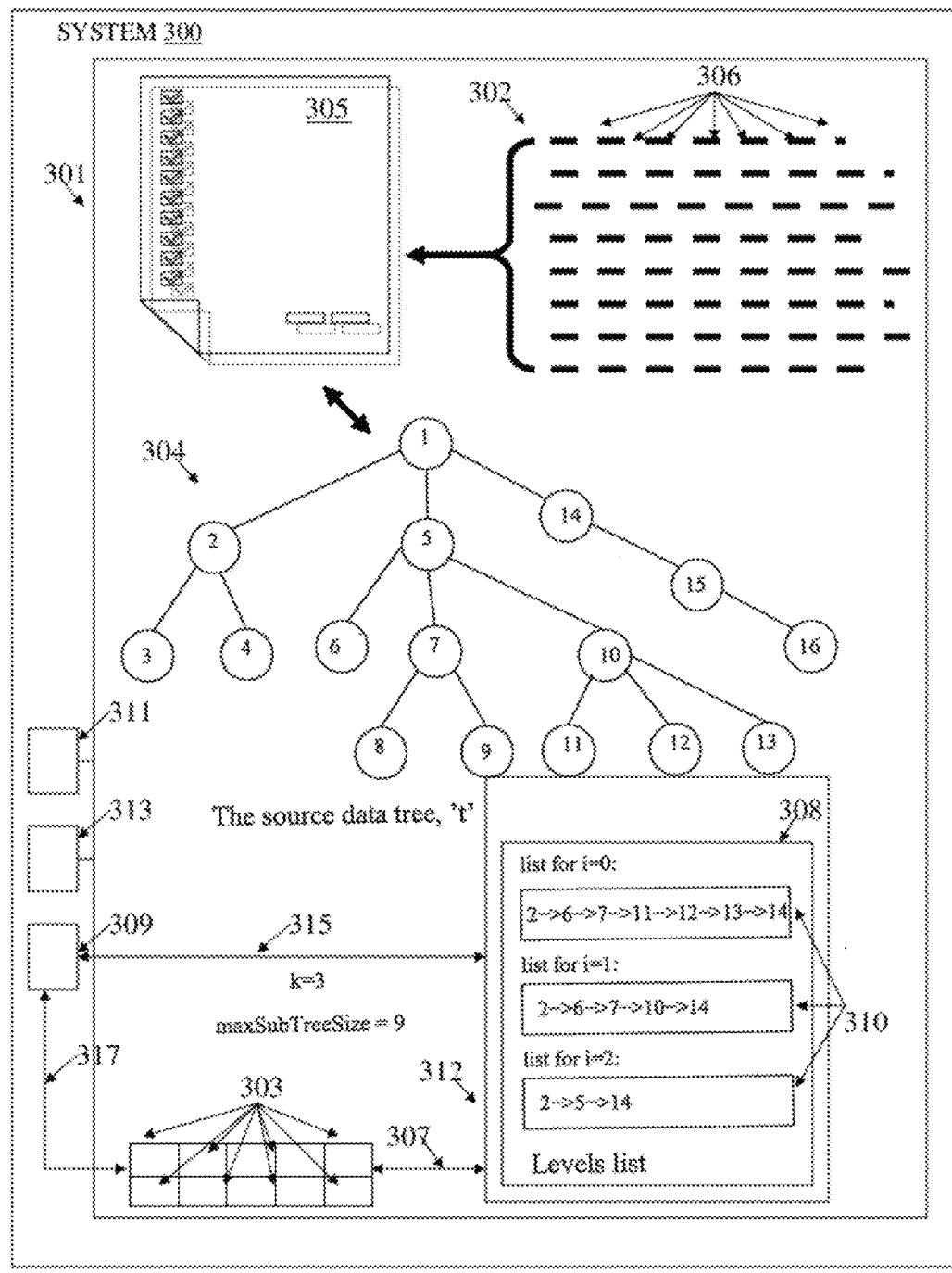
FIG. 3 schematically illustrates a system for a processor to partition or divide a tree representation of a document in accordance with embodiments of the invention.

Reference is made to FIG. 3, which schematically illustrates a system 300 for a processor 301 to partition a tree 304 representation of a database or document 305 in accordance with embodiments of the invention.

System 300 such as a computer device, cellular device, or any other digital device such as a workstation, personal computer, laptop, cellular telephone, personal digital assistant (PDA), etc. may include processor 301. System 300 may include any device or system capable of executing a series of instructions to save, store, process, edit, display, project, receive, transfer, or otherwise use or manipulate data, for example, to partition tree 304 and search document streams 302. The device or system may include an input device 311 and an output device 313. Input device 102 may include a mouse, cursor, keyboard, touch-screen, audio-receiver, or other device for receiving user input. Output device 313 (for example, a monitor, projector, screen, printer, or display) may display data such as search results or other data on a user interface according to a sequence of instructions executed by a processor 301.

As described, document 305 may be represented by one or more trees 304 and one or more streams 302. To search multiple parts of document streams 302 in parallel, processor 301 may partition or divide each stream 302 into a plurality of sub-streams 306 according to a partition of tree 304 into a plurality of sub-trees, for example, such that each sub-stream 306 may correspond to a different sub-tree. Tree 304 may be partitioned along edges so that each node of tree 304 is included in one of the sub-trees of tree 304. All sub-trees of a particular partition of tree 304 may be disjoint (e.g., containing no common nodes and/or edges). In one embodiment, the number of sub-trees in a partition of tree 304 may not exceed the number of hardware units or software mechanisms simultaneously available for processing the corresponding sub-streams in parallel. In other embodiments this need not be the case. Once a partition of tree 304 into sub-trees and the correlation of sub-streams 306 and sub-trees are defined, multiple threads may search different sub-streams 306 of a single stream 302 in parallel to increase searching efficiency.

Processor 301 may execute multiple threads in parallel, e.g., simultaneously (at the same time) or at approximately the same (but different) times, or concurrently. Processor 301 may include multiple processing units or cores 303 to execute multiple threads or tasks at the same time, where each processor or core 303 may execute a different thread or task. Alternatively, processor 301 may include a single core or processor, which may only execute one thread at a time. Processor 301 may switch threads substantially fast that the threads or tasks may be considered to run at the same time or in parallel. Processor 301 may switch between different threads, for example, using a time-division multiplexor. While a parallel processor having a processor 301 partitioned into multiple cores or processing units 303 is shown in FIG. 3, in other embodiments multiple different processors or computers, e.g., multiple personal computers, workstations, etc. may be connected to process a search in parallel.

Processor 301 may be connected to data memory 312 via a data memory bus 307 for transferring data therebetween. Data memory 312 may store document 305, partition data and any input, output or interim data generated by a search. Data memory 312 may include, for example, random access memory (RAM), dynamic RAM (DRAM), flash memory, cache memory, volatile memory, non-volatile memory or other suitable memory units or storage units. Processor 301 may also be connected to a secondary memory 309, via a data memory bus 317 for transferring data therebetween. Secondary memory 309 may (or may not) be external to processor 301. Data memory 312 may also be connected to a secondary memory 309, via a data memory bus 315 for transferring data directly between memories 312 and 309. When the size of search data is greater than a maximum available storage space in data memory 312, search data including document 305, streams 302, tree 304, and/or level lists array LLA 308, may be stored in secondary memory 309. Processor 301 may load only the relevant sub-streams and partition information for a search from the secondary memory 309 to data memory 312 to be processed.

Data memory 312 and/or secondary memory 309 may store partition information in a level lists array (LLA) 308 including a plurality of different potential partitions of tree 304. Each array entry 310 may correspond to a different partition of tree 304. LLA 308 may store k different partitions of tree 304, each with a different partition index i=0, k−1. Parameter k (the number of different potential partitions of tree 304) may be an adjustable parameter. The optimal value of k may differ based on the processing system operating a search and may be, for example, 5-7, although other values may be used (in FIG. 3, k=3). Although increasing parameter k may increase computational time for generating additional potential partitions, such disadvantage may be outweighed by an overall benefit if the additional partition is used and the reduction in processing time of searching document 305 with the selected additional partition is greater than the increased time used to generate the additional partitions. The parameter value (k) may be set by a programmer or automatically by processor 301, e.g., based on known system specifications or by executing or running a test search with different parameter (k) values and using the parameter value with the fastest search time.

Each different potential partition or division (i=0, k−1) of tree 304 may differ in the number of sub-trees and the maximum size of the sub-trees. Each node may have an associated sub-tree size (e.g., numOfSubtreeNodes) defining the size of a sub-tree branching from that node. A partition mechanism may search or scan sequential nodes, e.g., in stream 302, and may define a partition at nodes with an associated sub-tree size less than (or equal to) the maximum sub-tree size for that partition. The partition mechanism may skip (not define a partition) at nodes with an associated sub-tree size greater than the maximum sub-tree size for that partition. Accordingly, sub-trees may have sizes ranging from one node to the maximum number of nodes (size) associated with that partition. Therefore, all sub-trees in each partition may have a similar size (differing by at most the maximum number of nodes associated with that partition less one).

The plurality of potential partitions of tree 304 (e.g., in LLA 308) may be generated using the tree structure position information field associated with each node in tree 304. In one embodiment, a single tree structure field, e.g., numOfSubtreeNodes, may be used, which defines the size of or number of nodes in a sub-tree that branches from that particular node. The maximum size (number of nodes) of a sub-tree in a partition of tree 304 at partition index i may be defined based on the tree structure field assigned to each node, for example, as (i+1)*largestSubTreeSize/k (e.g., provided that the parent node from which the sub-tree st branches does not satisfy this condition). The largestSubTreeSize may be the number of nodes of the largest potential sub-tree in tree 304 (eventually reduced in the partition to the actual maximum sub-tree size limit, e.g., less than or equal to (i+1)*largestSubTreeSize/k). Tree 304 may be partitioned at root nodes having a sub-tree size (numOfSubtreeNodes) less than or equal to the maximum sub-tree size ((i+1)*largestSubTreeSize/k).

In the example illustrated in FIG. 3, the number of partitions k is 3 (defining partitions of indices i=0, 1, 2) and the largestSubTreeSize is 9 (the middle potential sub-tree with root node (5) has 9 nodes). Other numbers may be used.

For a first partition, when partition index i=0, the maximum sub-tree size is, e.g., 3=(1*9/3). A partition mechanism may search the associated sizes of potential sub-trees rooted at each node until a node has a sub-tree size that is less than or equal to the maximum sub-tree size, e.g., 3. Tree 304 may be partitioned at nodes that are the root of sub-trees having size (numOfSubtreeNodes) less than or equal to 3. Nodes (2), (6), (7), (11), (12), (13), and (14) have sub-tree sizes less than or equal to 3 and are therefore the roots of sub-trees in this partition for partition index i=0.

For a second partition, when partition index i=1, the maximum sub-tree size is 6=(2*9/3). The partition mechanism may search the associated sizes of potential sub-trees rooted at each node until a node has a sub-tree size that is less than or equal to the maximum sub-tree size, e.g., 6. For the first node (1), there are 16 nodes in a tree branching from node (1), which is greater than the maximum size, 6. Therefore, node (1) is not its own sub-tree and may be partitioned. Proceeding to the next sequential node (2) within the tree to be partitioned, the sub-tree size rooted at node (2) is 3 (i.e., numOfSubtreeNodes field associated with node (2) is 3), which is less than the maximum sub-tree size 6, so node (2) may be a root of a first sub-tree. The next sequential node after nodes (2), (3), and (4), partitioned into the first sub-tree, is node (5). The sub-tree size (numOfSubtreeNodes) associated with node (5) is 9, which is greater than 6, so node (5) is not the root of its own sub-tree and may be further partitioned. The next sequential node (6) has a sub-tree size (numOfSubtreeNodes) of 1 node (itself), which is less than the maximum sub-tree size, 6, may therefore become its own separate sub-tree. The next sequential node (7) has a sub-tree size (numOfSubtreeNodes) of 3, also less than the maximum sub-tree size, 6, and may become the root of a sub-tree with nodes (8) and (9). The next sequential node (10) has a sub-tree size (numOfSubtreeNodes) of 4, also less than the maximum sub-tree size, 6, and may become the root of a sub-tree with nodes (11), (12) and (13). The next sequential node (14) has a sub-tree size (numOfSubtreeNodes) of 3, which is less than 6, and therefore becomes a root of a sub-tree with nodes (15) and (16). Since there are no more nodes in tree 304 that are not part of one of the sub-trees, the node (14) sub-tree may be the last sub-tree and the partition process may end. Ancestor node (1) may or may not be considered a sub-tree.

For a third partition, when partition index i=2, the maximum sub-tree size is 9=(3*9/3) nodes. The sub-trees of nodes (2) and (14) have size smaller than 9, and the size of the sub-tree rooted at node (5) is exactly 9, so the partition includes 3 sub-trees (rooted at nodes (2), (5), (14)).

The plurality of potential partitions of tree 304 (i=0, 1, 2, entries 310 in LLA 308) may be generated in one pass of nodes in tree 304. Other numbers of partitions, k, maximum sizes of sub-trees in each partition, and tree structure fields may be used to partition tree 304. For example, the number of potential partitions, k, may be increased to generate additional partitions (with higher partition indices i) with larger sub-tree sizes and fewer sub-trees; similarly, the number of potential partitions, k, may be decreased to restrict the partition to sub-trees with smaller sizes with a greater number of the sub-trees. In other embodiments, the maximum sizes of sub-trees may be adjusted or set to any value for each partition and may be incremented by any number (not only 1) between different partitions.

Figure 4:
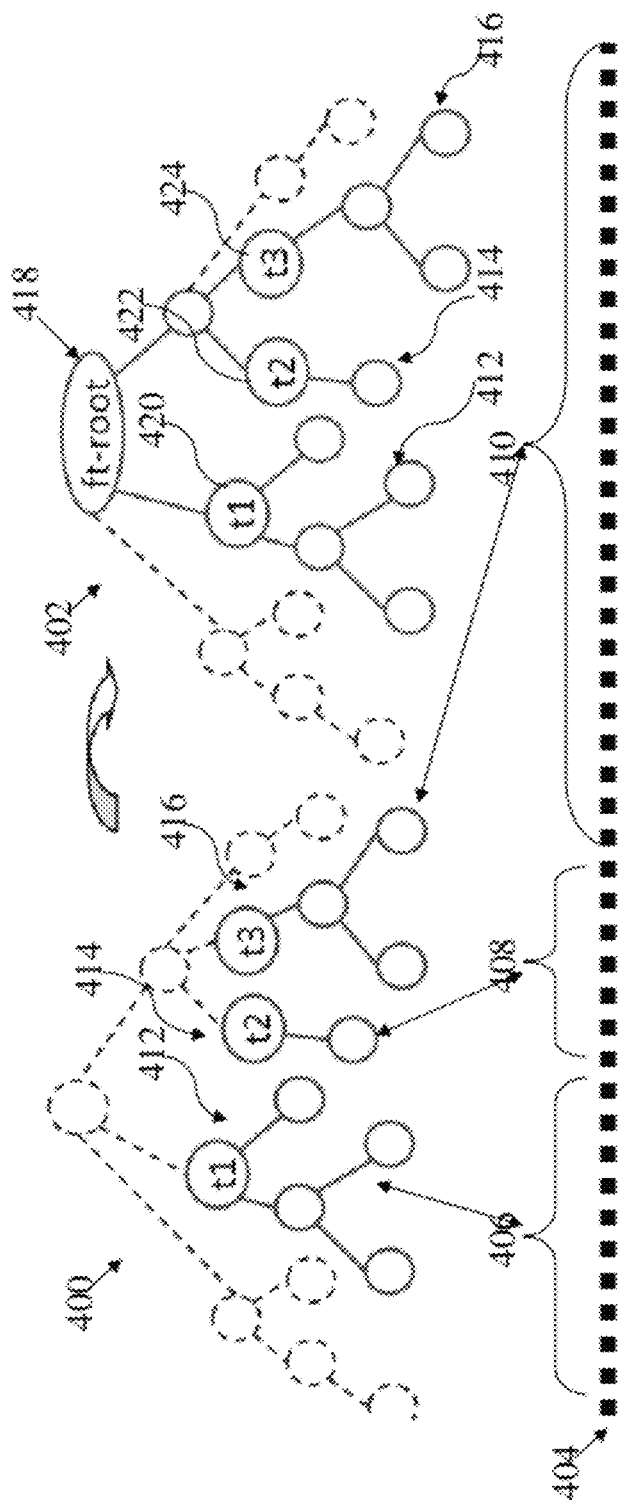
FIG. 4 schematically illustrates a mechanism for partitioning a stream representation of a document in accordance with embodiments of the invention.

Reference is made to FIG. 4, which schematically illustrates a mechanism for partitioning a stream 404 representation of a document in accordance with embodiments of the invention.

Embodiments of the invention may generate a partition of a tree 400 representation of a document or database (e.g., document 305 of FIG. 3) into a plurality of disjoint sub-trees 412, 414, 416 (e.g., as described in reference to FIG. 3). Embodiments of the invention may correlate a sub-set of nodes or sub-streams 406, 408, 410 of stream 404 with corresponding nodes in each of sub-trees 412, 414, 416 of partitioned tree 400, respectively. A plurality of processing threads may search the respective plurality of sub-streams 406, 408, 410 in parallel.

Sub-trees 412, 414, 416 may be sequentially ordered in a group, g. Let qStreams be a set of streams 404 of query nodes of a query twig pattern q. Embodiments of the invention may indicate start and end indices of sub-streams 406, 408, 410 (for each stream 404 in the qStreams set that belongs to full tree 402). Full tree 400 may include paths from the (entire) document tree root 418 to the root 420, 422, 424 of each of the sub-trees 412, 414, 416 of group g, respectively. In one example, partitioned tree 400 may include sub-trees 412, 414, 416 (e.g., t1,t2,t3) of sub-tree group g, which are rooted in full tree 402 (e.g., ft).

Embodiments of the invention may determine the boundaries or the start and/or end indices of a sub-stream, such as a sub-stream 406 in stream 404, for example, using a binary search or using partition information fields, for example, extended XML stream storage fields (EXSS), such as, numOfSubtreeNodes, indexInStream, structuralData and/or subStreamsH. Embodiments of the invention may search for a node n with the smallest index in stream 404 that belongs to full tree 402 and has the smallest possible left position value (e.g., LeftPos indicating the number of words from the beginning of a document until the start of the data element in the document). In the example illustrated in FIG. 4, the root nodes of sub-trees 412 and 416 (e.g., the first and the last sub-trees t1 and t3 in g) are nodes 420 and 424 (e.g., rt1 and rt3), respectively. Embodiments of the invention may search for the node n in stream 404 such that the node's left position value (n.leftPos) is the smallest one possible while the node's right position value (n.rightPos) is greater than the left position value for the root node 420 of the first sub-tree 412 (rt1.leftPos) and smaller than the right position value for the root node 424 of the last sub-tree 416 (rt3.rightPos). Such a node n is the first node in stream 404 (with the smallest possible left position value) that belongs to tree 402 and is therefore the start node of the sub-stream 406 correlated with the first sub-tree 412. The end index of a sub-stream 406 in stream 404 may be obtained directly from the right position value of node n (n.rightPos). First sub-stream 406 correlated with first sub-tree 412 may be fully defined by the start and end nodes in stream 404 associated with the first and last nodes of sub-tree 412. This process may proceed to find the start and end nodes in stream 404 associated with the next sequential sub-trees 414, until all streams are correlated with all sub-treed in tree 402. All nodes whose left position value is greater than (or equal) to the left position value of node n and smaller than the right position value of the root of the last sub-tree 416 in g belong to tree 402. In the example illustrated in FIG. 4, all nodes belong to sub-stream 406 whose left position value is greater than (or equal) to the left position value of node n (n.leftPos) and smaller than the right position value of the root node of the last sub-tree 416 (rt3.rightPos).

Figure 5:
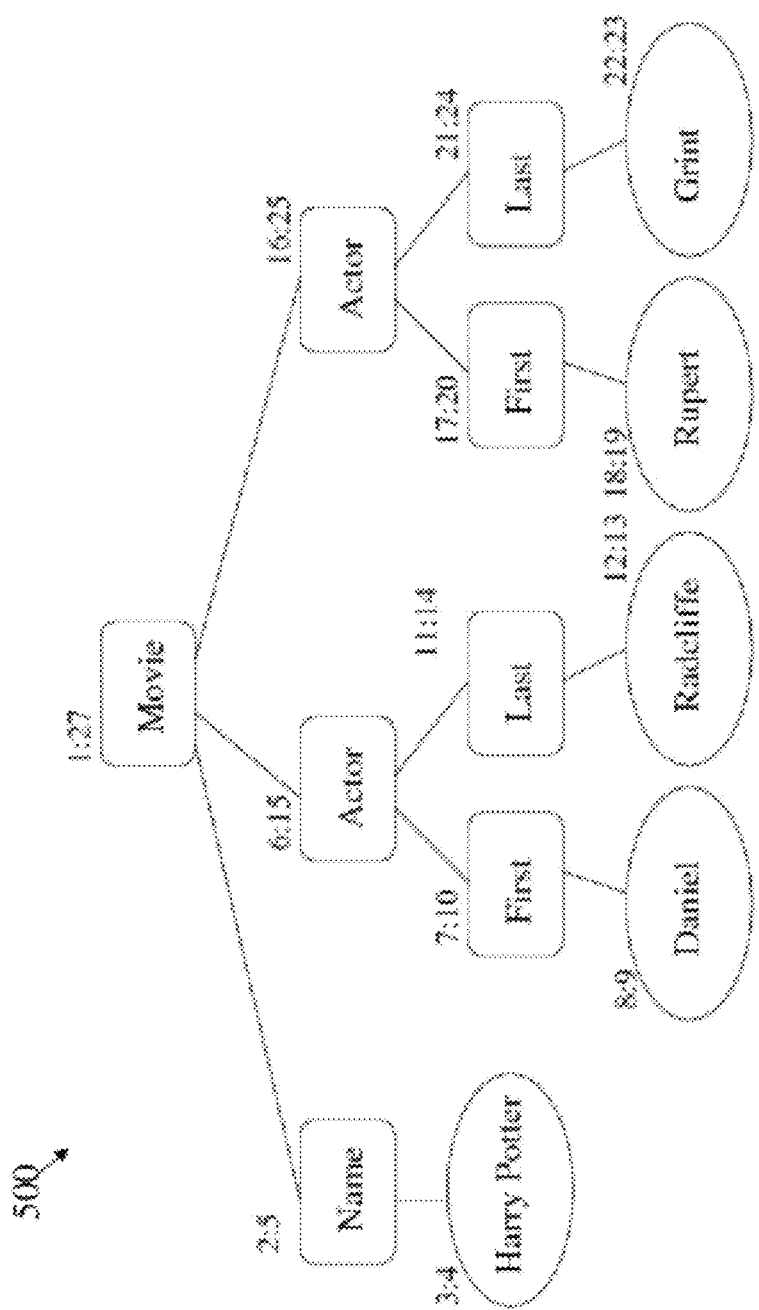
FIG. 5 schematically illustrates a tree representation of a document in accordance with embodiments of the invention.

Reference is made to FIG. 5, which schematically illustrates a tree 500 representation of a document in accordance with embodiments of the invention. Tree 500 may represent a document or database (e.g., document 305 of FIG. 3).

Embodiments of the invention may partition or "cut" document tree 500 into approximately equal size sub-trees (all less than a predetermined maximum sub-tree size). A partition may be selected (e.g., from LLA 308 of FIG. 3), for example, using a chooseDocPartition function. The partition may be selected that has the highest partition index i, such that the number of sub-trees in the partition is greater than or equal to a predetermined value, N, where N may be set according to the size of the document. In one example, N=cX where X is the document size and c is a system parameter (between 0 and 1). Parameter c may be chosen according to the available size of memory (e.g., random access memory (RAM)) in the run system to maximize the number of parallel searches of sub-streams.

Once a partition of document tree 500 is selected, each sub-tree thereof may be an independent task, a plurality of which may form a "pool" of tasks, which may be executed in parallel by respective independent processing threads or processes. A number of threads or processes may be activated (e.g., according to numOfThreads parameter), each executing one or more (e.g., a numOfTasks) of the sub-tree tasks in parallel, until all the tasks are processed. Each thread or process may be executed on a core 303 of FIG. 3. Alternately, a set of processes or threads may be executed in series on each core 303. Note that each group of sub-tree tasks may be sequenced according to the sub-tree order in tree 500. After picking (e.g., numOfTasks) sub-trees from tree 500, each thread may detect correlated sub-streams (bounded by start and end nodes) in all streams of query nodes of a query twig pattern q (e.g., as described in reference to FIG. 4). A search process may then search for the query twig pattern, q, in a plurality of the sub-streams, in parallel, for example, correlated with a sub-tree partition, as described in the process implemented in the pseudo-code of Table 1. The pseudo-code provides one example where the query pattern is a path expression, q, where a path expression may be a sequence of nodes connected via edges; other embodiments may use different operations.

TABLE 1

Process for a Plurality of Threads to Search in Parallel for a path Query Pattern in Document Streams.

| Input: | 1) The source document tree.<br>2) The path expression referred to as q.<br>3) numOfThreads.<br>4) numofTasks |
|---|---|
| Output: | The answers to q. |
| Method: | |
| | 1. partition = chooseDocPartition( ) |
| | 2. pool = makePoolOfTasks(partition) |
| | 3. create Threads(numOfThreads) |
| | 4. WHILE an unprocessed task t exists in pool |
| | 5. thread = findAvailableThread( ) |
| | 6. tasks = pickTasks(thread, pool, numOfTasks) |
| | 7. thread.runThread(tasks, q) |
| | // runThread function: |
| Input: | 1) group of tasks tasks.<br>2) The path expression referred to as q. |
| Output: | The answers to q found in tasks. |
| Method: | |
| | 8. subStreamsLimits = findSubStreams(tasks) |
| | 9. WHILE NOT eof(tasks,subStreamsLimits) |
| | 10. qN = getMin(tasks, subStreamsLimits, q) |
| | 11. clean stacks |
| | 12. push $T_{qN}$'s first element to $S_{qN}$ |
| | 13. IF qN is a leaf node |
| | 14. expand solutions |

The input for the parallel search (e.g., of Table 1) may include the source document tree 500, a query twig pattern q, numOfThreads defining a number of threads to be executed or run in parallel, and numOfTasks defining a number of tasks to selected in each iteration by each thread. The parallel search may choose an appropriate partition (e.g., from the level lists array 308 in FIG. 3 using the chooseDocPartition function). After partitioning, all the sub-trees of the partition may form a pool of tasks, where each sub-tree may constitute one task. The pool of tasks is created, e.g., in line 2 of Table 1. A plurality of (e.g., all) threads may be activated according to the numOfThreads parameter in line 3 of Table 1. Each activated thread may input a numOfTasks tasks from the pool (line 6 of Table 1) and may process those tasks (line 7 of Table 1). This process may continue until all tasks in the pool are processed (lines 4-7 of Table 1). The limits of sub-streams of query nodes of q that belong to full tree ft may be detected (line 8 of Table 1) and assigned to a structure called subStreamLimits. Function eof (line 9 of Table 1) may be used to check if all the sub-streams that belong to tree 500 have finished. Function getMin (line 10 of Table 1) may be used to find the node with the smallest left position (LeftPos) value in all the sub-streams that belongs to tree 500 to correlate sub-streams with sub-tree partitions. Lines 9-14 of Table 1 may be used to search each sub-stream in parallel for occurrences of the query twig pattern q. It may be appreciated by persons of skill in the art that although the process of Table 1 is described to operates on queries with an ancestor-descendant relationship or axe (//), this process may be easily adapted to work with a parent-child relationship or axe (/).

Embodiments of the invention may execute a plurality of independent simple tasks in parallel (limited in size by sub-tree sized tasks less than a predetermined maximum size) for relatively fast searching. Embodiments may balance unevenly distributed trees by loading tasks of uniform size) to maximize efficiency.

In the example illustrated in FIG. 5, tree 500 may represent a document or database of movie information. A query twig pattern q may be "/Movie//last//Radcliffe" and the number of threads available for processing the search (numOfThreads) may be, e.g., 2. A partition with, e.g., 3, sub-trees may be selected (e.g., from LLA 308 of FIG. 3 using chooseDocPartition function). The root nodes of the selected partition may be, for example, (2;5,2), (6:15,2) and (16:25,2). Each available thread may retrieve a number of tasks (numOfTasks) in each iteration equal to, e.g., 1. A first thread (e.g., of the 2 available threads) may process the sub-tree rooted at node (2:5,2). A second thread (e.g., of the 2 available threads) may process the sub-tree rooted at (6:15,2). Each respective thread may find sub-streams correlated with the sub-tree rooted at node (2:5,2) (e.g., in the stream with element label "name") and the sub-tree rooted at node (6:15,2) (e.g., in the streams with element labels "actor," "first," and "last"). The limits of all sub-streams of the query twig pattern q may be found that belongs to tree 500 (e.g., using the findSubStream function in line 8 of Table 1), for example, including a path from the entire document tree root node ('movie') to the root node (6:15,2) of sub-tree task 2. Each thread may search the sub-stream (e.g., defined by SubStreamsLimits) corresponding to the sub-tree tasks retrieved by the thread to generate and output one full path answer (1:27,1), (11:14,3), (12:13,4) (lines 9-14 of Table 1). Since the first thread in this example has a simpler task (its sub-tree does not yield any answer), the first thread most likely completes its task before the second thread and may retrieve and process the next available task in the task pool, e.g., the third task of the sub-tree rooted at node (16:25,2). In this example, only the second task (searching the sub-stream correlated with the second tree) yields a search result.

Figure 6:
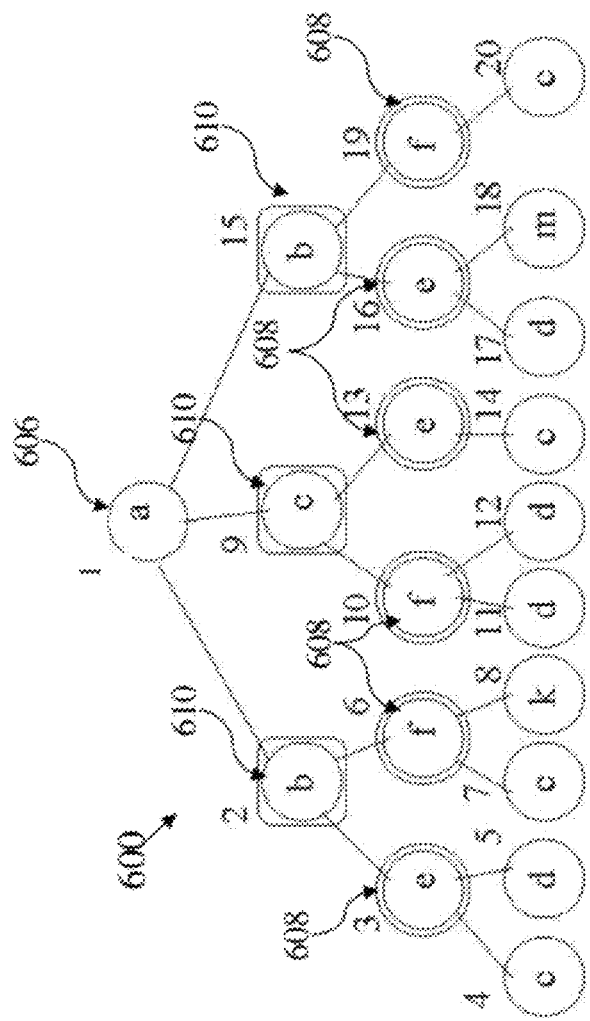
FIG. 6 schematically illustrates a mechanism for selecting a partition of a tree representation of a document in accordance with embodiments of the invention.
Figure 6:
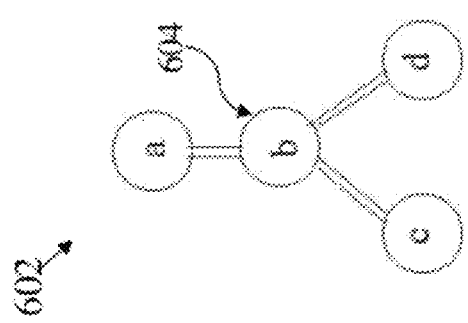

Reference is made to FIG. 6, which schematically illustrates a mechanism for searching a document with branching search paths in a tree 600 representation in accordance with embodiments of the invention. Tree 600 may represent a document or database (e.g., document 305 of FIG. 3). A query twig pattern 602 may have multiple divergent or branching search paths for searching the document tree 600, e.g., indicated by a split or branching at a junction node 604.

When a query twig pattern 602 has multiple search paths within one query, partitioning tree 600 may be more complex since a search solution may be divided between different sub-trees, for example, half of a query answer may be located within one sub-tree and the other half may be located within another sub-tree. That is, a partition may break answers apart.

Accordingly, partitions of tree 600 may be generated that do not divide solutions. For a selected partition of partition index i (e.g., stored in the LLA 308 of FIG. 3), embodiments of the invention may determine if the partition may potentially break an answer apart (e.g., into different sub-trees). For example, the partition mechanism may use an adapted chooseDocPartition function to provide such a test. If the partition mechanism determines that the selected partition does not break answers apart, the partition may be used to search. However, if the partition mechanism determines that the selected partition does potentially break answers apart, the partition may be discarded (e.g., deleted from the LLA) and updated with the next sequential partition (e.g., of lower partition index i−1 with a smaller number of sub-trees but with a bigger maximum size). Embodiments of the invention may determine if the updated partition may potentially break an answer apart. This iterative process may continue until a partition is found determined to not break answers apart (e.g., each answer is completely contained within a single one of the sub-trees).

To determine if a partition of tree 600 may potentially break an answer apart, the partition mechanism may proceed as follows:

Find a node 604 in a minimal level that splits into more than direction (e.g., has more than one child node) in query twig pattern 602. This node may be referred to as a "junction" node.

For each sub-tree in the partition of tree 600, check for each node n on a path between the document root node 606 and each sub-tree root node, whether the element label of node n equals the label of the junction node 604 (e.g., label "b"). A positive test result for at least one path may indicate that a partition defining the sub-tree in that path may potentially break an answer apart and the partition should not be used.

In the example illustrated in FIG. 6, junction node 604 in query twig pattern 602 may have element label (b). A selected sub-tree partition (with partition index i) is illustrated in FIG. 6 by double circles around the root nodes 608 of the (six) partitioned sub-trees. A node (e.g., n=(2)) on a path between document root node 606 and the sub-tree root node 608 is labeled (b), which is the same label as the junction node 604. Accordingly, the test result is positive, indicating that the partition may potentially break a solution apart (e.g., the solution of the nodes (1),(2),(5),(7)), and the partition may not be used. An updated partition (with partition index i+1) is illustrated in FIG. 6 by squares with embedded circles around root nodes 610 of the partitioned (three) sub-trees. The updated partition may have sub-trees that are rooted at a higher index level than the previous partition. In one embodiments, the updated partition may have a fewer number of sub-trees with a larger maximum size. The updated partition, which does not result in a positive test result, and may not break a solution apart, may be used to search for query twig pattern 602 in tree 600.

It may be noted that the closer the label of junction node 604 is to document root node 606 (for example, in tree level two or three), the fewer the number of potential different document tree partitions and sizes available that do not break apart solutions, e.g., divide sub-trees. However, considering the variety of elements in a typical document, it is rare that the label of junction node 604 is found near document root node 606. However, even if the junction node 604 is close to document root node 606, e.g., causing a partition to retreat to a low level close to document root node 606, since the number of sub-trees in a typical document is large even at a low level (e.g., much greater than the number of available threads), even a partition with sub-tree roots at a low level may have a sufficient number of possible paths on which the threads may operate. Furthermore, many documents are "flat" (more wide than deep), for example, having many sub-trees each with a relatively small depth, thereby further increasing the number of potential partition paths.

However, in some cases (e.g., if the label of junction node 604 is document root node 606), no partition may pass the test (e.g., all partitions may break apart solutions to the query). In such a case, embodiments of the invention may divide query twig pattern 602 into a plurality of sub-query twig patterns at the junction node 604. Each of the plurality of sub-query twig patterns may be searched for in tree 600 as separate queries and the answers thereof may be joined to provide the final search results.

A search process for searching for query twig pattern 602 having multiple divergent search paths branching from junction node 604, by a plurality of threads, operating in parallel, may proceed, for example, as described in the process implemented in the pseudo-code of Table 2. The pseudo-code provides one example; other embodiments may use different operations.

TABLE 2

Process for a Plurality of Thread to Search in Parallel for a Branching Query (Twig) Patten in Document Streams.

| Input: | 1)The source document tree. |
| | 2)The twig pattern referred to as q. |
| | 3)numOfThreads. |
| | 4)numofTasks |
| Output: | The answers to q. |
| Method: | |
| 1. | partition = chooseDocPartition( ) |
| 2. | pool = makePoolOfTasks(partition) |
| 3. | createThreads(numOfThreads) |
| 4. | WHILE an unprocessed task t exists in pool |
| 5. | thread = findAvailableThread( ) |
| 6. | tasks = pickTasks(thread, pool, numOfTasks) |
| 7. | thread.runThread(tasks, q) |
| // runThread function: | |
| Input: | 1)group of tasks tasks. |
| | 2)The twig pattern referred to as q. |
| Output: | The answers to q found in tasks. |
| Method: | |
| 8. | subStreamsLimits = findSubStreams(tasks) |
| 9. | WHILE (NOT eof(tasks, subStreamsLimits)) |
| 10. | qN = getNext(q,tasks, subStreamsLimits) |
| 11. | clean stacks |
| 12. | IF $T_{qN}$'s first element is part of a solution |
| 13. | push it to $S_{qN}$ |
| 14. | IF qN is a leaf node |
| 15. | expand solutions |
| 16. | mergeAllPathSolutions( ) |

The input for the parallel search (e.g., of Table 2) may include the source document tree 600, query twig pattern 602, numOfThreads defining a number of threads to be operated, executed or run in parallel, and numOfTasks defining a number of tasks to selected in each iteration by each thread. The parallel search may choose an appropriate partition (e.g., from the level lists array 308 in FIG. 3 using the chooseDocPartition function), such that each solution is contained within a single sub-tree and does not cross over into another sub-tree. The sub-trees of the partition may form a pool of tasks, where each sub-tree may include one task. The pool of tasks may be generated, e.g., in line 2 of Table 2. A plurality of (e.g., all) threads may be activated according to the numOfThreads parameter in line 3 of Table 2. Each activated thread may input a numOfTasks tasks from the pool (line 6 of Table 2) and may process those tasks (line 7 of Table 2). This process may continue until all tasks in the pool are processed (lines 4-7 of Table 2). The limits of sub-streams of query nodes of q that belong to tree ft may be detected (line 8 of Table 2) and assigned to a structure called subStreamLimits. Function eof (line 9 of Table 2) may be used to check if all the sub-streams that belong to tree 600 have finished. Function getNext (line 10 of Table 2) may be used to identify the next node to be processed (e.g., a node ordered in the sub-streams representing tree 600 that corresponds to query twig pattern 602 and has the smallest left position (LeftPos) value in the stream, which may be guaranteed to be part of a solution). Lines 9-16 of Table 2 may be used to search each sub-stream in parallel for occurrences of query twig pattern 602.

Searching multiple sub-streams of a single stream in parallel according to embodiments of the invention may not increase the complexity of the system, input/output (I/O) and the run time of threads, as compared with each thread searching each stream as a whole, one entire stream after another. The I/O and total time complexities of the parallel search mechanism may grow linearly with the sum of the sizes of the r input lists (streams) and the output list. Furthermore, when nodes in streams are distributed uniformly in the document tree, the run time complexity of the parallel search mechanism may be, for example, $$O\left(\frac{TwigStack\ Complexity}{T}\right),$$

where T is the number of available threads.

Document streams (e.g., streams 302 of FIG. 3) and partition data (e.g., stored in LLA 308 of FIG. 3) may be uploaded from a system memory (e.g., data memory 312 of FIG. 3) for searching. However, when the documents streams or partition data are too large to store in the system memory, embodiments of the invention may store the document streams and/or partition data (e.g., LLA) in a secondary (e.g., external) memory unit (e.g., secondary memory 309 of FIG. 3). The processor may load only the relevant sub-streams for a search from the secondary memory unit (e.g., secondary memory 309) to the primary memory unit (e.g., data memory 312). To identify the relevant sub-streams, information for sub-trees and query twig patterns 602 may be stored so that the size of all relevant sub-streams in a sub-tree needed to answer the query q may be easily computed. For example, in addition to the (numOfSubtreeNodes) tree structure field, described herein, an additional tree structure field (subStreamsH) may be associated with each node, for example, indicating if a sub-stream includes a node that belongs to a sub-tree that is rooted at a node n). The tree structure fields (e.g., subStreamsH) may be stored, for example, only for nodes that are roots of a sub-tree to save memory space. The tree structure fields may be stored as node data, e.g., uploaded with the data streams, or in the LLA, e.g., separate from the data streams and not as part of node data.

After parsing the document, a file or other storage structure may be generated for each stream (e.g., on a disk or hard drive). The file may include a list of strings, one string for each document node. The string may include encoding data and document information for the corresponding node (e.g., DocId, LeftPos:RightPos,LevelNum, numOfSubtreeNodes, subStreamsH)). For example, for a node n in stream s, the string may be "3:78,2". Other information may be included.

When a new query or search is received, a process or processor (e.g., processor 301 of FIG. 3) may proceed as follows; other steps or series of steps may be used:

Select a sequence of consecutive sub-trees for the selected partition (e.g., stored in LLA 308 of FIG. 3), for example, such that the sum of the sizes of the sub-streams correlated with the selected sub-trees is smaller than S, a system parameter. System parameter S may define the available or allocated memory for processing the query search. A sequence of sub-trees, $p_1$, may be selected starting from a sub-tree at sub-tree index 1 through sub-tree index i (where the total cumulative size of the sub-trees is at most S).

Load the chosen sequence of sub-trees $p_j$, for example, from a secondary memory (e.g., secondary memory 309 of FIG. 3) to a main memory (e.g., data memory 312 of FIG. 3), and search for the received query in the sequence of sub-trees $p_j$, where $p_j$ serves as the pool of tasks for the executed algorithm.

These steps may be executed iteratively for each sequence of sub-trees in tree 600. For example, a next sequence of sub-trees, $p_2$ (subsequent to sequence $p_2$) may be selected starting from a sub-tree at index i+1. This iterative process may proceed until all sub-trees in the full tree are searched.

If the available memory for processing the query search is too small to store partition information (e.g., LLA 308 of FIG. 3), the partition information may be stored in a separate location, e.g., on a separate disk or long term storage, a separate memory, etc. (e.g., secondary memory 309 of FIG. 3). Each time the query process is executed, only the selected partition information may be retrieved (e.g., from the entry 310 corresponding to the selected partition in the LLA) and only the part relevant to generating the new sequence of sub-trees may be uploaded to the memory for searching.

The specific location of data, e.g. loading certain data to a "main memory," need not be used in other embodiments.

Figure 7:
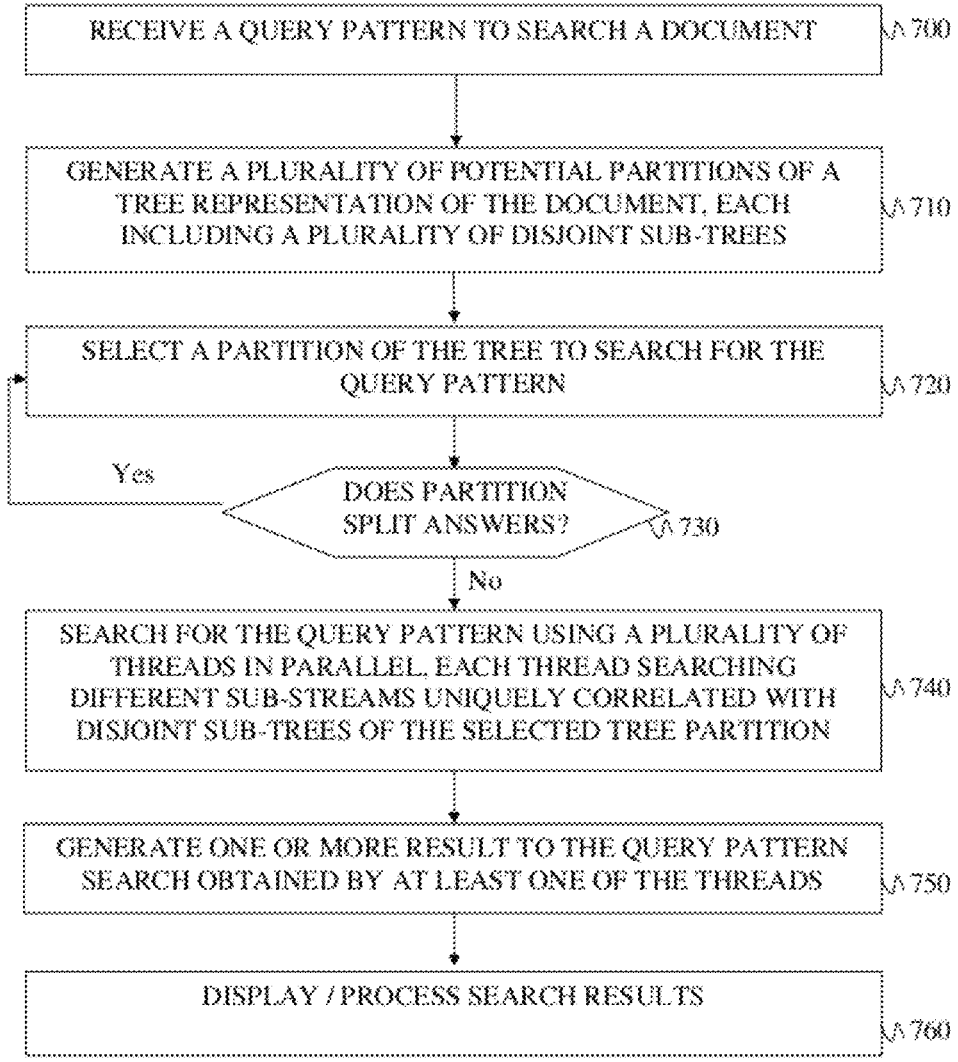
FIG. 7 is a flowchart of a method in accordance with an embodiment of the invention.

Reference is made to FIG. 7, which is a flowchart of a method in accordance with an embodiment of the invention.

In operation 700, a processor (e.g., processor 301 of FIG. 3) may receive a query pattern (e.g., query twig pattern 204 of FIG. 2) defining a search query in a document (e.g., document 305 of FIG. 3). A query may be received from a user (e.g., via input device 311 of FIG. 3 operating a search field in a user interface), e.g., as plain-text or values, and may be transformed into a tree structure query pattern by the processor. The document may be represented by a tree (e.g., tree 304 of FIG. 3) including nodes and edges and a plurality of streams, each stream including a linear sequence of nodes (e.g., streams 302 of FIG. 3), e.g., stored in a system memory. Each of the plurality of streams may be associated with nodes having a common element label as the stream. In some embodiments, streams need not be used. To convert a multi-dimensional tree to a linear stream, information about the tree structure may be encoded in the stream to retain information defining the correlations and relationships between nodes in the tree. In some embodiments, each stream may store position information defining a correlation between nodes in each stream and nodes in the tree. Position information may include fields such as, for example, DocId, LeftPosRightPos, LevelNum.

The processor dividing the data into tasks or threads may be the same as, or different than, the processor or processors executing the tasks or threads. The tasks may be divided sequentially, after which a multi-core processor (e.g., processor 301 of FIG. 3) may operate multiple threads to search for multiple sub-tree segments in parallel. Alternatively, either or both of the division of tasks and the searching of streams may be executed sequentially or in parallel.

In operation 710, the processor may generate a plurality of potential partitions or divisions of a tree representation of the document. Each partition may include a plurality of groupings of nodes and edges of the tree into sub-trees such that each node of the tree is in exactly one sub-tree (i.e., no node is in more than one sub-tree or in no sub-trees). Each partition may have a different number of sub-trees and a different corresponding maximum size of the sub-trees. The number of potential partitions generated may be defined by a system parameter. The system parameter may be automatically set based on system memory or set by a user (e.g., via input device 311 of FIG. 3). Each incremental partition i may have a fewer number of sub-trees of larger size than the previous partition i–1. Data representing the plurality of potential partitions may be stored, e.g., in a designated partition memory (e.g., LLA 308 of FIG. 3). In some embodiments, partitioning need not be used. Other memory and storage structures may be used.

In some embodiments, data representing the plurality of potential partitions may be stored in a primary (e.g., central processor) memory (e.g., data memory 312 of FIG. 3). However, in other embodiments, there may be a limited amount of primary memory available for searching. To save space in the primary memory, data representing the sub-trees (e.g., LLA) may be stored in a separate memory (e.g., an external memory such as a disk, external flash drive or hard-drive) (e.g., secondary memory 309 of FIG. 3). Data representing a sub-set of the sub-trees for the partition may be transferred in each iteration of the search from the secondary memory to the primary memory, for example, such that the sum of the sizes of the sub-streams correlated with the selected sub-trees is smaller than a maximum value of available space in the processor memory. Other memory or storage structures may be used.

In operation 720, the processor may select one of the plurality of potential partitions to search the tree for the query pattern. The selected partition may be the one that has the smallest number of sub-trees greater than a predetermined number set according to the size of the document. The predetermined number may be, for example, N=cX where X is the document size and c is a system parameter defined based on available memory size. In some embodiments, a user may select the partition or override the partition selected by the processor.

In some embodiments, the streams may store partition information defining the partition of the tree into sub-trees according to the selected partition. To define the sub-tree partition in streams, each stream may store partition information defining a correlation between nodes in each of the plurality of sub-trees of the selected partition and nodes in a plurality of different and disjoint corresponding sub-trees streams within the streams.

In operation 730, the processor may determine if the selected partition divides solutions to the query pattern. The partition may be determined to divide solutions if the query pattern has a node that splits with an element label that is the same as an element label of a node in the data tree between the root node of the entire tree and the root node of a sub-tree of the partition. If the processor determines that the partition selected in operation 720 divides solutions to the query pattern, the partition may be discarded and a process may proceed to operation 720 to select another partition from the plurality of potential partitions. The next partition may be one with the next smallest number of sub-trees greater than the predetermined number. If the processor determines that the partition selected in operation 720 does not divide solutions to the query pattern, the partition may be used and a process may proceed to operation 740.

If all of the potential partitions divide solutions, a process may divide the query pattern into a plurality of sub-query patterns, search for each of the sub-query patterns and combine the search results for the sub-query patterns to provide a result of the query pattern.

In operation 740, the processor may search for the query pattern, for example, by executing or using a plurality of processes or threads operating independently and/or in parallel. Each of two or more of the threads may be used to search different sub-streams of one or more of the plurality of streams. Each of the different sub-streams, searched for by each thread, in one or more streams may be uniquely correlated with one or more different and/or disjoint sub-trees of a partition of the tree into a plurality of sub-trees. Each thread may search for sub-streams correlated with those respective disjoint sub-trees. The processor may execute or run a binary search to locate sub-stream boundaries and thereby correlate the sub-streams with the unique disjoint sub-trees. Alternatively, the processor may receive partition information fields (e.g., stored with the node position information in the streams), for example, identifying sub-stream boundaries and which sub-tree nodes correlate to which sub-stream nodes.

In operation 750, the processor may generate a result of the query pattern search using at least one of the threads. The result may be positive when one or more matches to the query pattern are detected in one or more respective sub-trees or negative when no match is detected. The result of the query pattern search may be, for example, a sequence or set of one or more words or values of the document represented by (an n-tuple of) nodes in one or more sub-streams (e.g., which may be correlated with nodes in one or more sub-trees of the partition) that match the nodes of the query pattern. The result of the query pattern search may also be, for example, the position information of the words or values in the document or in the tree representation thereof. In another embodiment, the result of the query pattern search may include only data nodes corresponding to target nodes (e.g., a root node, a junction node, a leaf node, etc.). For example, one of the plurality of nodes in the query pattern may be designated to be a target node. Each result of the query pattern search may include a single document node matching the target node of the query pattern. In another embodiment, the result of the query pattern search may be, for example, highlighting, retrieving, marking, flagging, tagging, labeling, or otherwise indicating the words or values in the document or nodes in the streams, stacks, or trees that correspond to the query pattern.

In operation 760, a monitor device (e.g., output device 313 of FIG. 3) may display the result of the search for the query pattern on a display, e.g., via a user interface, and/or the processor may use the search results as input fields in another process.

Other operations of orders of operations may be used.

When used herein, "searching", "generating" or "processing" a document or data, a tree representation of a document or data, or a stream representation of a document or data, may include creating and manipulating data representing the document, tree or stream that is stored for example in a computer processing system in a memory unit. Embodiments of the invention may manipulate data representations of real-world objects and entities such as documents, tables, and spreadsheets. Data may be manipulated and stored, e.g., in a memory unit, and may be presented to a user, e.g., as a visualization on a display or user interface.

Various embodiments are discussed herein, with various features. However, not all features discussed herein must be in all embodiments.

Embodiments of the invention may include an article such as a computer or processor readable medium, or a computer or processor storage medium, such as for example a memory, a disk drive, or a USB flash memory, encoding, including or storing instructions, e.g., computer-executable instructions, which when executed by a processor or controller, carry out methods disclosed herein.

Although the particular embodiments shown and described above will prove to be useful for the many distribution systems to which the present invention pertains, further modifications of the present invention will occur to persons skilled in the art. All such modifications are deemed to be within the scope and spirit of the present invention as defined by the appended claims.

The invention claimed is:

1. A method for searching a document for a query pattern, the method comprising:
   representing the document by a plurality of streams, wherein each of the streams is uniquely associated with one element label in the document and with all nodes in a data tree representation of the document associated with the element label;
   defining a plurality of disjoint sub-trees in the data tree;
   correlating one or more sub-streams of the streams with a respective different one or more disjoint sub-trees such that all nodes of each of the sub-streams belong to a respective disjoint sub-tree;
   searching for the query pattern by executing a plurality of threads, wherein each of the threads is used to search different one or more sub-streams; and
   generating a result of the query pattern search using at least one of the threads.

2. The method of claim 1, wherein the two or more of the plurality of threads are executed in parallel.

3. The method of claim 1, comprising generating a plurality of potential partitions, wherein the sub-trees are included in a partition selected from the plurality of potential partitions.

4. The method of claim 3, wherein each of the plurality of potential partitions has a different number of sub-trees and a different corresponding maximum size of sub-trees.

5. The method of claim 3, wherein the partition selected has the smallest number of sub-trees greater than a predetermined number set according to the size of the document.

6. The method of claim 3, comprising determining if the partition divides solutions to the query pattern and if so selecting a partition from the plurality of potential partitions that does not divide solutions to the query pattern.

7. The method of claim 6, wherein a partition is determined to divide solutions if the query pattern has a junction node with an element label that is the same as an element label of a node in the data tree between the root node of the entire tree and the root node of a sub-tree of the partition.

8. The method of claim 6, comprising, when all of the potential partitions divide solutions:
   dividing the query pattern into a plurality of sub-query patterns;
   searching for each of the sub-query patterns; and
   combining the search results for the sub-query patterns to provide the result to the query pattern.

9. The method of claim 3, comprising storing data representing the sub-trees in an external memory and transferring data representing a sub-set of the sub-trees for the partition from the external memory to a central processor memory in each iteration of a search such that the sum of the sizes of the sub-streams correlated with the selected sub-trees is smaller than a maximum value of available space in the processor memory.

10. The method of claim 3, wherein each of the different sub-streams in each stream is uniquely correlated with a single disjoint sub-tree of the partition of the tree into the plurality of sub-trees.

11. The method of claim 1, comprising executing a binary search to correlate the sub-streams with the unique disjoint sub-trees.

12. The method of claim 1, comprising displaying the result of the query pattern search, wherein the result of the query pattern search is a sequence of one or more words or values of the document represented by nodes in a sub-stream correlated with nodes in a sub-tree that match the nodes of the query pattern.

13. The method of claim 1, comprising designating one of the plurality of nodes in the query pattern to be a target node, wherein the result of the query pattern search is a plurality of answers, each comprising a single document node matching the target node of the query pattern.

14. A system for searching a document for a query pattern, the system comprising:
   a memory to store a plurality of streams, wherein each of the streams is uniquely associated with one element label in the document and with all nodes in a data tree representation of the document associated with the element label; and
   a processor to:
      define a plurality of disjoint sub-trees in the data tree,
      correlate one or more sub-streams of the streams with a respective different one or more disjoint sub-trees such that all nodes of each of the sub-streams belong to a respective disjoint sub-tree,
      search for the query pattern in the streams by executing a plurality of threads, where each of two or more of the threads is used to search different sub-streams of the plurality of streams, and generate a result of the query pattern search using at least one of the threads.

15. The system of claim 14, wherein the processor includes a plurality of processing cores to execute the two or more of the plurality of threads in parallel.

16. The system of claim 14, wherein the processor generates a plurality of potential partitions, wherein a partition that includes the sub-trees is selected from the plurality of potential partitions.

17. The system of claim 16, wherein the processor generates each of the plurality of potential partitions to have a different number of sub-trees and a different corresponding maximum size of sub-trees.

18. The system of claim 16, wherein the processor selects the partition that has the smallest number of sub-trees greater than a predetermined number set according to the size of the document.

19. The system of claim 16, wherein the processor determines if the partition divides solutions to the query pattern and if so selects a partition from the plurality of potential partitions that does not divide solutions to the query pattern.

20. The system of claim 16, further comprising an external memory to store data representing the sub-trees, wherein the processor is to transfer data representing a sub-set of the sub-trees for the partition from the external memory to the data memory in each iteration of a search such that the sum of the sizes of the sub-streams correlated with the selected sub-trees is smaller than a maximum value of available space in the data memory.

21. The system of claim 14, comprising a monitor to display the result of the query pattern search.

22. The system of claim 21, wherein the result of the query pattern search include a sequence of words or values of the document represented by nodes in a sub-stream correlated with nodes in a sub-tree that match the nodes of the query pattern.

23. A method for searching a document for a query pattern, the method comprising:

representing the document by a plurality of streams, wherein each of the streams is uniquely associated with one element label in the document and with all nodes in a data tree representation of the document associated with the element label;

storing position information in each stream defining a correlation between nodes in each stream and nodes in the data tree;

storing partition information in each stream defining a correlation between nodes in each of a plurality of sub-streams of the streams and nodes in a plurality of sub-trees of a tree partition of the data tree;

searching for a query pattern in the streams by executing a plurality of threads, wherein each thread searches nodes of sub-streams within the streams correlated with nodes of different and disjoint sub-trees within the data tree for independently searching sub-streams within each stream in parallel; and generating a result of the query pattern search using at least one of the threads.

24. The method of claim 23, wherein the partition information for each node defining the sub-tree partition of the node in the document tree is stored together with the position information defining the position of the node in the document tree.

25. The method of claim 23, wherein the partition information is stored for each node in each stream.

26. The method of claim 23, wherein the partition information is stored for a sub-set of nodes in each stream.

27. The method of claim 23, wherein the partition information for a node is selected from the group consisting of: a number of nodes of a sub-tree that is rooted at the node, the positional of the node in a stream of its label, a pointer to a variable that holds additional structural information about the node, and whether or not a sub-stream includes at least one node that belongs to the sub-tree that is rooted at the node.

* * * * *